June 2, 1925.  
A. W. NELSON  
FEEDING DEVICE  
Filed March 27, 1924    2 Sheets-Sheet 1
1,540,703
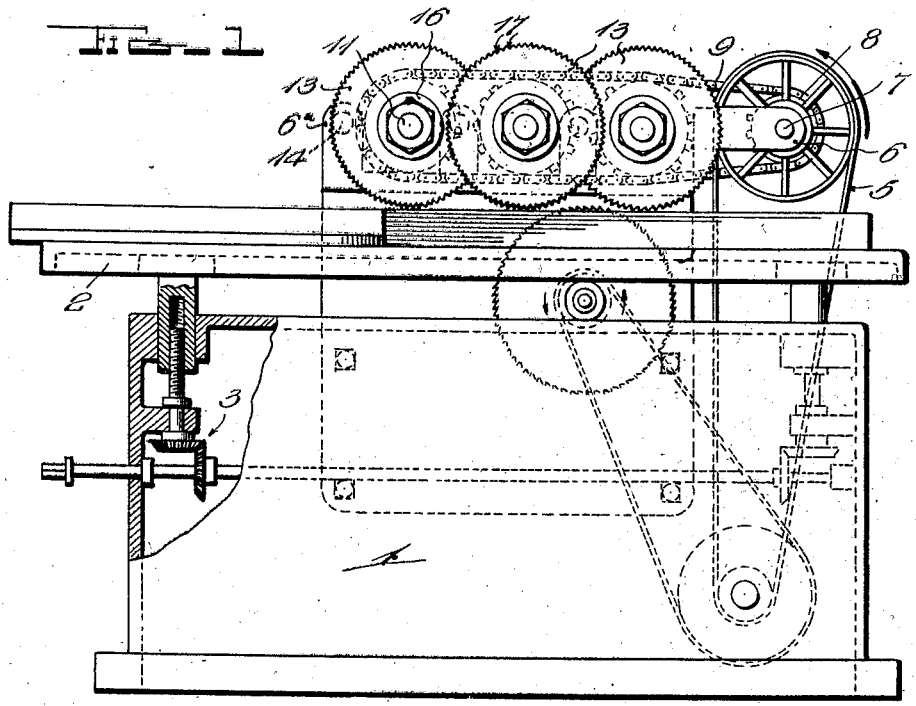
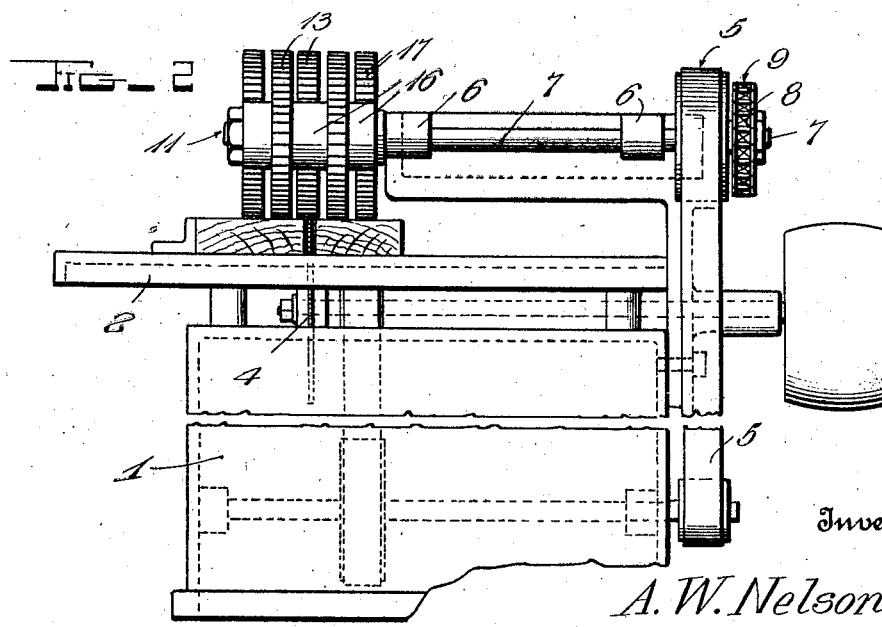
Inventor  
A. W. Nelson  
By H. B. Willson & Co.  
Attorneys

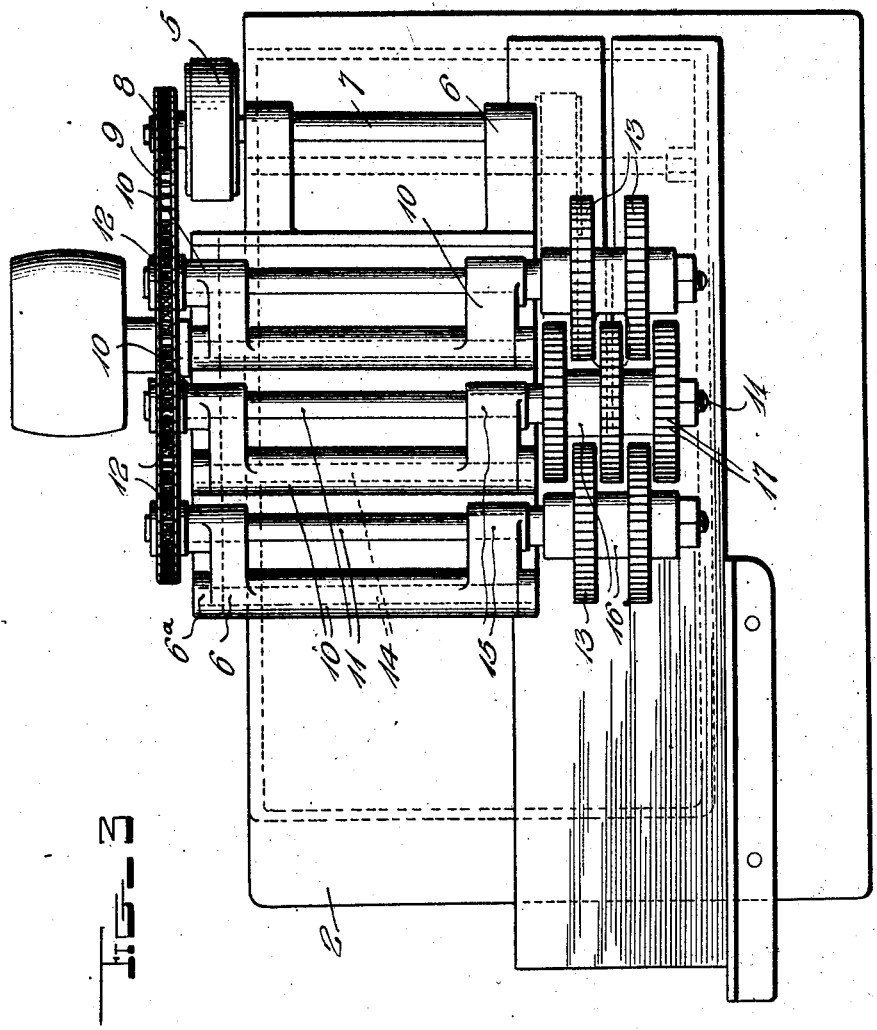

Patented June 2, 1925.

1,540,703

UNITED STATES PATENT OFFICE.

ARTHUR WILSON NELSON, OF WILLIAMSPORT, PENNSYLVANIA.

FEEDING DEVICE.

Application filed March 27, 1924. Serial No. 702,420.

*To all whom it may concern:*

Be it known that I, ARTHUR W. NELSON, a citizen of the United States, residing at Williamsport, in the county of Lycoming and State of Pennsylvania, have invented certain new and useful Improvements in Feeding Devices; and I do declare the following to be a full, clear, and exact description of the invention, such as will enable others skilled in the art to which it appertains to make and use the same.

This invention relates to feeding devices, and more specifically to an improved feed mechanism for wood-working machines such as saws, planers, shapers, joiners, etc.

One object of this invention is to generally improve upon devices of this character by providing an improved mechanism which will feed and guide short and uneven pieces of lumber or timber through a machine with an exceedingly accurate and positive action, thereby producing a superior quality of work with the minimum trouble, inconvenience and danger.

Other objects and advantages may become apparent to persons who read the following details of description in connection with the accompanying drawings in which,—

Figure 1 is a side elevation of a sawing machine partly in section, including my improved feeding device.

Fig. 2 is an end view of the machine, parts being broken out.

Fig. 3 is a top plan view of the machine.

Referring to these drawings in detail, in which similar reference characters correspond with similar parts throughout the several views, and in which the portions not described in detail are of ordinary construction, embodying a main frame or base 1, a work table 2 and an ordinary mechanism 3 for raising and lowering the table, a saw 4 being driven by a system of power transmission generally indicated at 5.

The invention comprises a feeder frame 6, a driving shaft 7, a driving sprocket 8, a driving chain 9, a plurality of pivotally mounted bearings 10, a plurality of rotary shafts 11, a plurality of sprocket wheels 12 and a plurality of feed-rolls 13.

The frame 6 may constitute an upward extension of the main frame 1, or may be rigidly secured thereto by any appropriate means, and this frame is formed with upwardly extending journal bearings 6$^a$ in which the pivots 14 of the bearing members 10 are journalled. The bearing members 10 are formed with journal bearings 15 which are eccentric to the pivots 14, so that the shafts 11 and the wheels carried by these shafts may be moved vertically independent of one another.

The feed rolls 13 are arranged in a plurality of sets, and in the present embodiment there are two sets consisting of two rolls each, and one set consisting of three rolls. The feed-rolls of each set may be formed integrally with one another and with their intervening and axially extending hub elements 16, or they may be formed separate from one another and from their hub elements and may be rigidly united with or secured on their respective shafts 11. A very important feature of the invention resides in the interlapping of the peripheries of the feed rolls, as more clearly illustrated in Figure 3, where it will be seen that the peripheries of the outer sets of feed rolls 13 extend between the outer feed-rolls of the middle set, while the central feed-roll has its periphery extending between the peripheries of the feed-rolls of the outer sets. There is only a slight clearance between the peripheries of one set and the hubs of the other set of feed-rolls, so that the lower or wood-engaging portions of the rolls are only a comparatively small distance from one another. Therefore, the lower edges of the feed-rolls of two or more sets simultaneously engage with a comparatively short piece of wood so as to hold the piece of wood against turning or twisting on the feed-table independently of other guiding means. It should be understood that each of the feed-rolls is provided with the usual serrations or corrugations 17 for preventing the piece of wood from slipping with relation to the feed-rolls. However, any appropriate anti-slipping means may be substituted for the serrations 17. Moreover, any appropriate number and arrangement of feed-rolls may be substituted for the arrangement here illustrated, provided that the peripheries are lapped or interlapped with relation to one another, and that the feed-roll or feed-rolls carried by each shaft is movable laterally of its axis without effecting movement of the feed-rolls on the other shafts 11.

The sprocket chain 9 is carried by the driving sprocket wheel 8 and the foremost sprocket wheel 12, and the other sprocket wheels 12 are disposed between the sprocket wheels which carry the chain 9, and these intermediate sprocket wheels have their upper and lower or diametrically opposite teeth engaged with the sprocket chain, so that the latter simultaneously rotates the three sets of feed-rolls while permitting them to be moved laterally of their axes. In this connection, it should be understood that when one set of feed-rolls is raised by passing over a knot or lump on the piece of wood, so that its sprocket wheel is disengaged from the lower reach of the chain 9, its upper teeth are the more securely engaged with the upper reach of the chain 9, so that each set of feed-rolls is always positively and forcefully driven by the chain 9, for a similar result obtains when one of these sets of feed-rolls are lowered into a depression of the piece of wood being fed, that is, if it is lowered sufficiently to effect disengagement of its sprocket with the upper reach of the chain, it is the more securely engaged with the lower reach. It should be understood, however, that the sprocket chain 9 has sufficient slack to permit the upward and downward movements of each shaft 11 without causing the chain to effect a similar movement of the other shafts 11.

Although I have described this embodiment of my invention very specifically, it is not intended to limit this invention to these exact details of construction, but changes may be made within the scope of the inventive ideas as implied and claimed.

I claim:

1. In a feeding device for a wood-working machine, a plurality of rotary shafts each mounted for vertical movement independently of the others, a plurality of feed rolls having their peripheries interlapped with relation to one another and provided with wood-engaging peripheral surfaces to effect the feeding of a piece of wood supported by the machine, a plurality of sprocket wheels, each of said shafts carrying one of said feed-rolls and one of said sprocket wheels, and a sprocket chain in mesh with each of said sprocket wheels and being operatable to rotate said sprocket wheels in the same direction.

2. In a feeding device for a wood-working machine, a plurality of rotary shafts each mounted for vertical movement independently of the others, a plurality of feed rolls having their peripheries interlapped with relation to one another and provided with wood-engaging peripheral surfaces to effect the feeding of a piece of wood supported by the machine and means for driving said feed rolls.

In testimony whereof I have hereunto affixed my signature.

ARTHUR WILSON NELSON.